US012710154B2

(12) United States Patent
Brieskorn et al.

(10) Patent No.: US 12,710,154 B2
(45) Date of Patent: Aug. 18, 2026

(54) LIGHTING DEVICE FOR A MOTOR VEHICLE

(71) Applicant: Hella GmbH & Co. KGaA, Lippstadt (DE)

(72) Inventors: Thomas Brieskorn, Lippstadt (DE); Claudia Zens, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/319,376

(22) Filed: Sep. 4, 2025

(65) Prior Publication Data

US 2026/0085805 A1 Mar. 26, 2026

(30) Foreign Application Priority Data

Sep. 20, 2024 (DE) ........................ 102024126388.1

(51) Int. Cl.
*F21S 43/241* (2018.01)
*F21S 43/245* (2018.01)
*F21S 43/249* (2018.01)

(52) U.S. Cl.
CPC ........... *F21S 43/241* (2018.01); *F21S 43/245* (2018.01); *F21S 43/249* (2018.01)

(58) Field of Classification Search
CPC ....... F21S 43/241; F21S 43/245; F21S 43/249
See application file for complete search history.

(56) References Cited

U.S. PATENT DOCUMENTS

| | | | | |
|---|---|---|---|---|
| 2003/0026106 | A1* | 2/2003 | Knaack | G02B 6/001 362/555 |
| 2008/0002400 | A1* | 1/2008 | Huang | F21S 43/237 362/216 |
| 2016/0161080 | A1* | 6/2016 | Grosdidier | F21S 43/14 362/509 |
| 2020/0256535 | A1* | 8/2020 | Kizaki | F21S 43/237 |
| 2020/0310022 | A1* | 10/2020 | Wilcox | G02B 6/0038 |
| 2021/0172579 | A1* | 6/2021 | Tsuchiya | F21S 43/33 |
| 2022/0026622 | A1* | 1/2022 | Wu | G02B 6/0035 |
| 2022/0080883 | A1* | 3/2022 | Chung | F21S 43/26 |
| 2022/0289104 | A1 | 9/2022 | Koehne et al. | |
| 2023/0118012 | A1 | 4/2023 | Wang et al. | |

(Continued)

FOREIGN PATENT DOCUMENTS

| | | | |
|---|---|---|---|
| CN | 204062789 | U | 12/2014 |
| DE | 202004020705 | U1 | 11/2005 |
| DE | 102013208925 | A1 | 11/2014 |

(Continued)

*Primary Examiner* — Christopher E Dunay
(74) *Attorney, Agent, or Firm* — Husch Blackwell LLP

(57) ABSTRACT

A lighting device for a motor vehicle is provided with an optical waveguide and a printed circuit board. The printed circuit board has an upper surface and an opposite, lower surface in the vertical direction (Z). The printed circuit board is populated with a first light source and second light source. The optical waveguide has: a light-emitting section forming a closed loop and propagates light along the light-emitting section based on total internal reflection, wherein the light-emitting section has light-emitting optics along the light-emitting section for emitting a portion of the light propagated along the light-emitting section; a first light-entry section; and a second light-entry section.

13 Claims, 4 Drawing Sheets

(56) References Cited

U.S. PATENT DOCUMENTS

2024/0401762 A1* 12/2024 Ah ........................ F21S 43/237

FOREIGN PATENT DOCUMENTS

| | | | |
|---|---|---|---|
| DE | 102008034052 | B4 | 8/2019 |
| DE | 102020108404 | A1 | 9/2021 |
| DE | 102013010550 | B4 | 6/2024 |
| JP | 2016035855 | A | 3/2016 |
| JP | 2021170444 | A | 10/2021 |

* cited by examiner

LIGHTING DEVICE FOR A MOTOR VEHICLE

CROSS REFERENCE

This application claims priority to German Application No. 10 2024 126388.1, filed Sep. 20, 2024, the entirety of which is hereby incorporated by reference.

FIELD OF THE INVENTION

The present invention relates to a lighting device for a motor vehicle, and in particular, the invention relates to a tail lamp for a motor vehicle.

BACKGROUND OF THE INVENTION

Optical waveguides, often referred to as light pipes or light guides, are used to an increasing extent in lighting devices for motor vehicles. Optical waveguides are based on the concept of total internal reflection to enable propagation of light along the optical waveguide. These optical waveguides often have light-emitting optics over their length that can have structures and/or optical elements such as pads, prisms and/or cylindrical lenses for emitting, in particular diffusing, a portion of the light in the optical waveguide.

By way of example, DE 10 2020 108 404 A1 discloses tail lamps for a motor vehicle that contain an optical waveguide.

A system is described in US Pat. No. 2022/0289104 A1 with an assembly that enables a 360° lighting by design elements in a motor vehicle in which overlapping optical waveguides are used to form a loop.

DE 10 2008 034 052 B4, DE 10 2013 010 550 B4, and US Pat. No. 2023/0118012 A1 disclose other prior arts.

One problem with the use of optical waveguides is that more light is emitted near where the light enters them than further away. Consequently, it is difficult to obtain a uniform light emission or lighting with the light emitted by the optical waveguide.

BRIEF SUMMARY OF THE INVENTION

The object of the present invention is to create a better lighting device for a motor vehicle in this regard.

The lighting device obtained with the invention is intended for a motor vehicle. It has: an optical waveguide; a printed circuit board, which has an upper and lower surface and is populated with a first and second light source; wherein the optical waveguide has a light-emitting section in the form of a closed loop which is configured to propagate light on the basis of total internal reflection over its length and has light-emitting optics where portions of the light are emitted, a first light-entry section, and a second light-entry section; wherein the first and second light-entry sections each have exposed ends through which light enters, which open into the light-emitting section, and the exposed ends of the first and second light-entry sections are placed such that light from the first light source enters the first light-entry section, and light from the second light source enters the second light-entry section.

As a result of this design, a particularly homogenous lighting of the annular light-emitting section can be obtained with a particularly compact assembly. Consequently, the light-emitting section appears to be particularly homogenously lit by the at least two light sources. In particular, this prevents the appearance of particularly bright areas where the light enters. Despite using at least two light sources, the lighting device can be particularly compact, because the light sources are on a single printed circuit board. This also reduces the amount of wiring necessary for the light sources. This simplifies assembly and uses less material.

Because the light-emitting optics are formed along the light-emitting section, light can be emitted over its entire length, resulting in a light-emitting section in the form of a closed loop.

It is advantageous when the first light source is on the upper surface of the printed circuit board and the second light source is on the lower surface. This results in a particularly compact design.

Preferably, there is a third light source on the upper surface of the printed circuit board, and a fourth on the lower surface, in which case the optical waveguide has third and fourth light-entry sections, each of which have exposed ends through which light enters, which are placed such that light from the third light source enters the third light-entry section, and light from the fourth light source enters the fourth light-entry section.

Despite using at least four light sources, the lighting device can still be particularly compact, because the four light sources are on a single printed circuit board, on both the top and the bottom.

The light-emitting section is preferably both above and below the plane defined by the printed circuit board. In other words, the light-emitting section passes through the plane defined by the printed circuit board.

The optical waveguide is preferably rigid.

The optical waveguide is preferably made of plastic, e.g. PMMA (poly(methyl methacrylate)).

The light sources preferably contain at least one light-emitting diode (LED).

The light sources are preferably secured in place on the printed circuit board.

The light-emitting section is preferably in a main plane.

It is particularly advantageous when the printed circuit board is perpendicular to the main plane. This allows the light form the light sources to enter the light-entry sections particularly effectively.

The printed circuit board is preferably at about mid-height with respect to the light-emitting section. This results in a particularly flat assembly.

It is particularly advantageous when the light-entry surfaces are on the end sections of the exposed ends.

Ideally, the first light-entry section is designed to propagate light entering the light-emitting section in a first circumferential direction, while the second light-entry section propagates light in the other circumferential direction through the light-emitting section. This is advantageous with regard to the homogenous lighting of the light-emitting section.

The third light-entry section is ideally configured to propagate light entering the light-emitting section in the second circumferential direction, while the fourth light-entry section propagates light in the first circumferential direction through the light-emitting section.

The lighting device is preferably a tail lamp.

The optical waveguide is ideally used for a taillight or rear light.

To simplify production and obtain a robust construction, the optical waveguide is ideally monolithic. This is considered advantageous with regard to a particularly simple assembly of the lighting device. The advantage of a monolithic optical waveguide is that it can be rigid. A rigid, monolithic optical waveguide fixes the positions of the light-entry sections in relation to one another, simplifying their alignment with the light sources on the printed circuit board. Consequently, the optical waveguide only has to be placed correctly in relation to the printed circuit board during assembly, such that the light-entry sections are aligned with the respective light sources.

The light-entry sections are ideally in the same plane. These light-entry sections are preferably placed in the main plane defined by the light-emitting section. This results in a particularly flat design, which is of particular advantage when the available space is limited, in particular perpendicular to the plane defined by the light-emitting section.

At least one of the light-entry sections can also be at an angle to the main plane defined by the light-emitting section, and/or the exposed end of this light-entry section can be offset to the main plane defined by the light-emitting section.

With regard to a particularly effective entry of the light, it is advantageous when at least one of the light-entry sections is curved, and preferably contains a change in curvature. Ideally, all of the light-entry sections are curved, in particular with a change in the curvature.

It is particularly advantageous when at least one of the light-entry sections opens into the light-emitting section. Ideally, all of the light-entry sections open into the light-emitting section.

Advantageously, at least one of the light-entry sections opens into the light-emitting section at an angle of less than or equal to 40°.

To reduce losses, it is advantageous when at least one of the light-entry sections is curved where it opens into the light-emitting section. This section, where it opens into the light-emitting section, is preferably concave.

The light-entry sections can also be offset in pairs to the main plane.

It is particularly advantageous when the light-emitting section is rectangular, with a straight first segment, which is at a right angle to a straight second segment, parallel to a straight third segment, and at a right angle to a fourth straight segment. Ideally, the first and second light-entry sections open into the first segment of the light-emitting section, and/or the third and fourth light-entry sections open into the third segment of the light-emitting section. This results in a particularly homogenous lighting of the light-emitting section with a particularly compact design.

In the case of a rectangular light-emitting section, it is particularly advantageous when the connections between adjacent segments are curved. This is particularly advantageous with regard to conducting the light propagated in the light-emitting section.

The first and second segments are preferably vertical.

In a particularly preferred design, the printed circuit board has a first section for the first and second light sources, and a second section for the third and fourth light sources. These first and second sections of the printed circuit board are preferably outside the area encompassed by the light-emitting section when viewing the main plane thereof from above. This keeps the area encompassed by the light-emitting section free for other lighting functions, e.g. brake lights or turn signals.

The light-entry sections ideally have no light-emitting optics, such that almost no light propagated in the light-entry sections can be emitted there, and almost all of the light propagated in the light-entry sections enters, or is conducted into the light-emitting section.

In a particularly preferred design, the first and second light sources and/or the third and fourth light sources are offset horizontally, in a direction perpendicular to the vertical. This has proven to be advantageous with regard to cooling the respective light sources and the printed circuit board. This offset arrangement facilitates cooling and prevents hot spots.

The light-emitting optics preferably have a light-emitting surface and an opposing functional surface, which is structured, in particular with prisms and/or lenses, e.g. pads, prisms, and/or cylindrical lenses.

It is particularly advantageous when the functional surface is closed. This functional surface is preferably on the back of the light-emitting section, which faces away from the visible side when the lighting device is used as intended. A reflector or reflecting surface can be placed next to the back of the light-emitting section to ensure that as much light as possible is emitted from the lighting device.

The printed circuit board can have a front edge with two notches through which the light-emitting section pass. This simplifies placement of the printed circuit board and the optical waveguide during assembly, ensuring that the light-emitting section is not covered by the printed circuit board in the direction in which the light is to be emitted. This also has the advantage that the overall horizontal length of the assembly composed of the printed circuit board and optical waveguide is kept to a minimum.

The lighting device advantageously has a housing and a cover for the housing, between which the optical waveguide is located, wherein the cover has a light-emitting window in the form of a closed loop for the light emitted by the light-emitting section.

The printed circuit board is preferably rigid.

The printed circuit board is preferably flat. This results in a printed circuit board that is much wider and longer than thick.

The motor vehicle obtained with the invention has the lighting device obtained with the invention. In this regard, the above explanations regarding the advantages and advantageous improvements of the lighting device also apply to the motor vehicle.

The term, "vertical" is used to define the positions of the upper and lower surfaces of the printed circuit board in the lighting device. This does not necessarily refer to the vertical direction in the motor vehicle. It is nevertheless advantageous when the printed circuit board is placed such that its vertical direction corresponds to that of the motor vehicle. The main plane formed and defined by the light-emitting section is preferably perpendicular to the plane defined by the printed circuit board. This main plane is preferably perpendicular to the length of the motor vehicle when the lighting device is used as a tail lamp.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
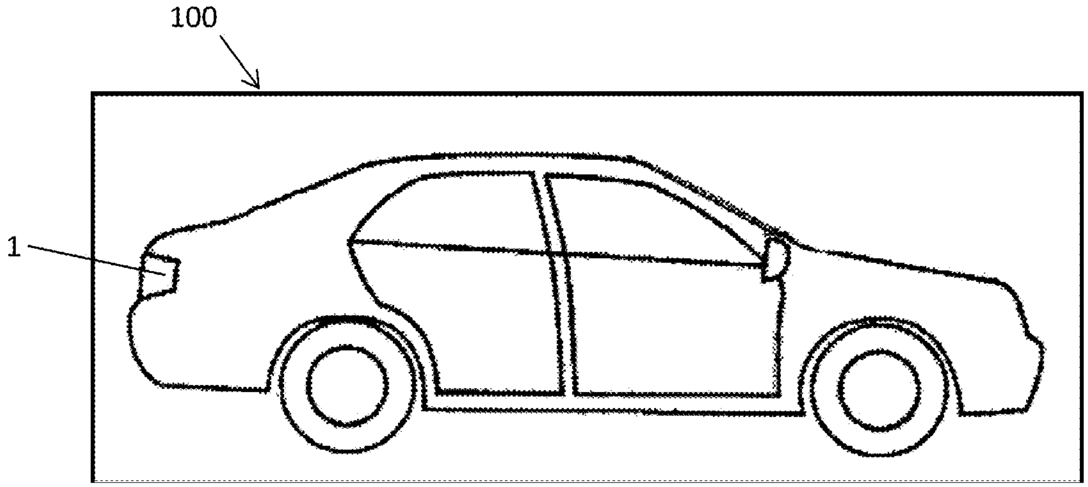
FIG. 1 shows a motor vehicle with the lighting device obtained with the invention in the form of a tail lamp, from the side.

The vertical direction Z is indicated by the arrow Z in the drawings. The lateral direction, which is perpendicular to the vertical, is indicated by the arrow Y. The horizontal direction X, which is perpendicular to the vertical direction Z and the lateral direction Y, is indicated by the arrow X.

FIG. 1 shows a motor vehicle 100 that has the lighting device obtained with the invention in the form of a tail lamp.

Figure 2:
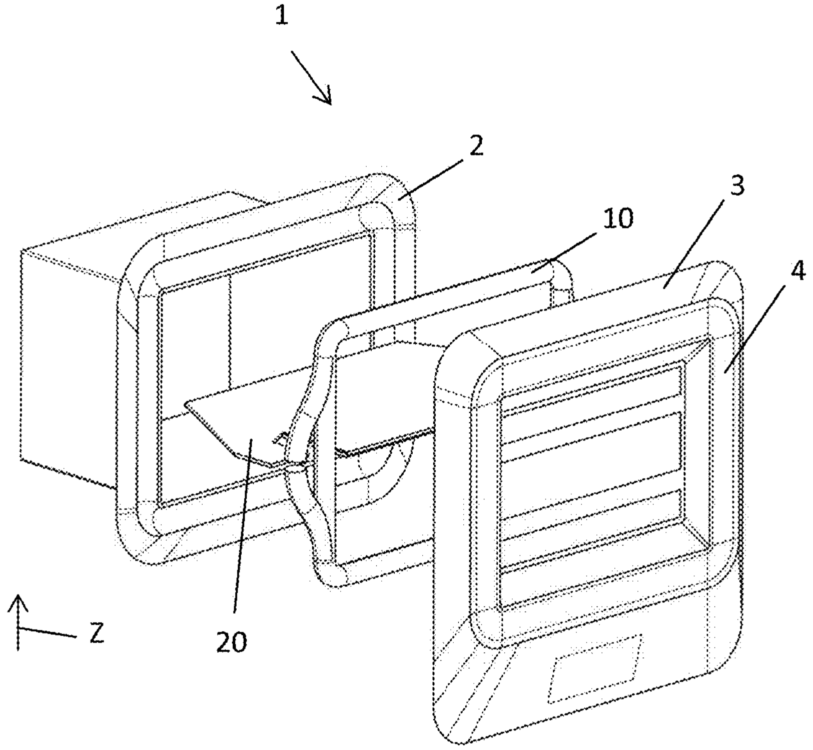
FIG. 2 shows a first embodiment of the lighting device obtained with the invention in an exploded view.

FIG. 2 shows components of the lighting device 1 in an exploded view. The lighting device 1 has a housing 2 and a cover 3 that covers the housing 2. The lighting device 1 has an optical waveguide 10 between the housing 2 and the cover 3. The optical waveguide 10 functions as a rear light in the tail lamp. The lighting device 1 contains a flat printed circuit board 20. The optical waveguide 10 and printed circuit board 20 are shown in greater detail in FIG. 3.

The optical waveguide 10 has a light-emitting section 15. This light-emitting section 15 is in the form of a closed loop. It is therefore uninterrupted. The light-emitting section 15 defines a main plane HE, to which the printed circuit board 20 is perpendicular.

This printed circuit board 20 is in the middle of the light-emitting section 15, which is therefore above and below the plane defined by the printed circuit board 20.

The light-emitting section 15 is designed to propagate light over its length based on total internal reflection. The light-emitting section 15 has light-emitting optics 161, 162 over its length for emitting portions of the light propagated over its length. In concrete terms, the light-emitting optics 161, 162 comprise a light-emitting surface 161 and an opposing functional surface 162. The functional surface 162 is structured in this example. The structure does not reflect all of the light propagated in the light-exiting section, allowing part of the light to exit the functional surface 162, or be reflected or diffused, such that it exits the light-emitting section 15 at the light-emitting surface 161 or the functional surface 162. The light-emitting optics 161, 162 can also contain lenses, e.g. pads, prisms and/or cylindrical lenses, for emitting a portion of the light propagated along the light-emitting section 16. The emitted light can then exit a light-emitting window 4 in the cover 4 forming a closed loop, to obtain the rear light function. In order to obtain the greatest possible light emission, the housing 2 can have a reflective surface, at least next to the light-emitting section 15.

The printed circuit board 20 is populated on the upper surface 21 and lower surface 22 with light sources 31, 32, 33, 34 in the form of light-emitting diodes (LEDs). The first light source 31 and third light source 33 are on the upper surface 21. The second light source 32 and fourth light source 34 are on the lower surface 22. The first light source 31 and third light source 33, which are on the upper surface 21, emit light perpendicular to the upper surface 21 of the printed circuit board 20. The third light source 33 and fourth light source 34, which are on the lower surface 22 of the printed circuit board 20, emit light perpendicular to the lower surface 22 of the printed circuit board 20, in the opposite direction of the light emitted by the first and third light sources 31, 33.

The optical waveguide 10 has a first light-entry section 11, a second light-entry section 12, a third light-entry section 13, and a fourth light-entry section 14. The light-entry sections 11 have exposed ends 111, 121, 131, 141. The end sections of the exposed ends 111, 121, 131, 141 form light-entry surfaces for the light in the respective light-entry sections 111, 121, 131, 141. The light-entry sections 11, 12, 13, 14 open into the light-emitting section 15, thus conducting light that enters the light-entry sections 11, 12, 13, 14 into the light-emitting section 15. The respective light-entry sections are curved multiple times with different curvatures. A curved end section 112, 122, 132, 142 of the respective light-entry section 11, 12, 13, 14, opening into the light-emitting section 15, is concave in relation to a portion of the light-emitting section 15 that the end section 112, 122, 132, 142 opens into.

The respective light-entry sections 11, 12, 13, 14 each have a dedicated light source 31, 32, 33, 34. In concrete terms, the exposed end 111 of the first light-entry surface 11 is placed such that the light emitted by the first light source 31 enters the first light-entry section 11 through a light-entry surface on the exposed end 111 of the first light-entry section 11. The same applies for the second light-entry section 12 and second light source 32, the third light-entry section 13 and third light source 33, and the fourth light-entry section 14 and fourth light source 34. The light emitted by the light sources 31, 32, 33, 34 enters the light-emitting section 15 through the respective light-entry sections 11, 12, 13, 14. Light entering the light-emitting section 15 through the first light-entry section 11 is propagated in a first circumferential direction, indicated by the arrow U1. Light entering the light-emitting section 15 through the second light-entry section 12 is propagated in a second circumferential direction, indicated by the arrow U2. The first and second circumferential directions U1 and U2 are opposite one another. Light entering the light-emitting section 15 through the third light-entry section 13 is propagated in the second circumferential direction U2. Light entering the light-emitting section 15 through the fourth light-entry section 14 is propagated in the first circumferential direction U1.

Figure 3:
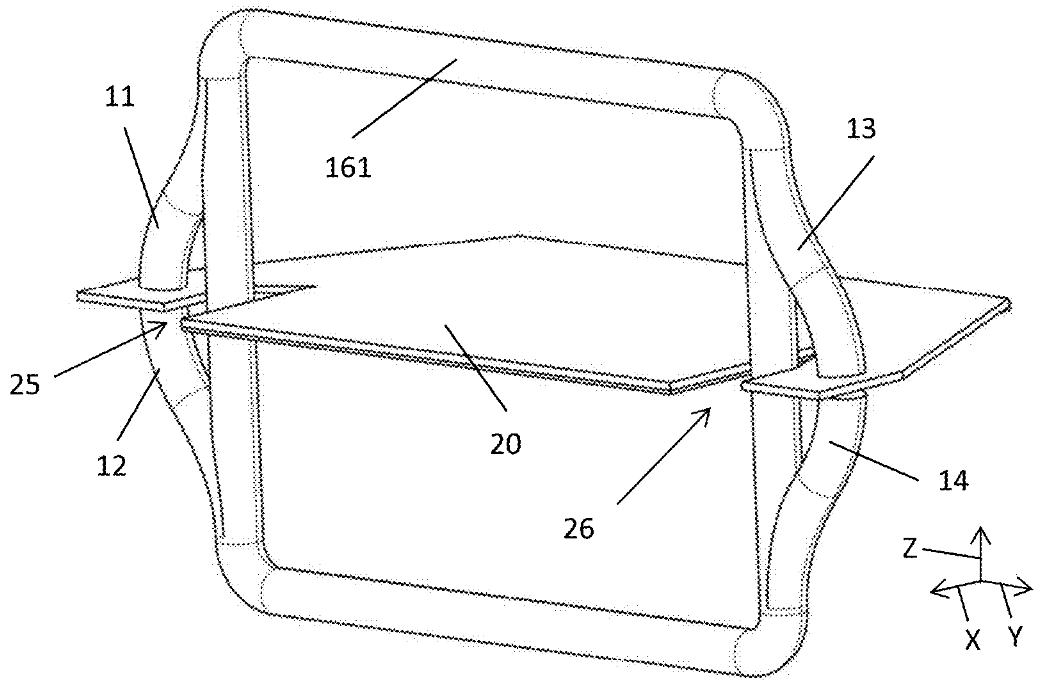
FIG. 3 shows components of the lighting device in FIG. 2, from a perspective.
Figure 4:
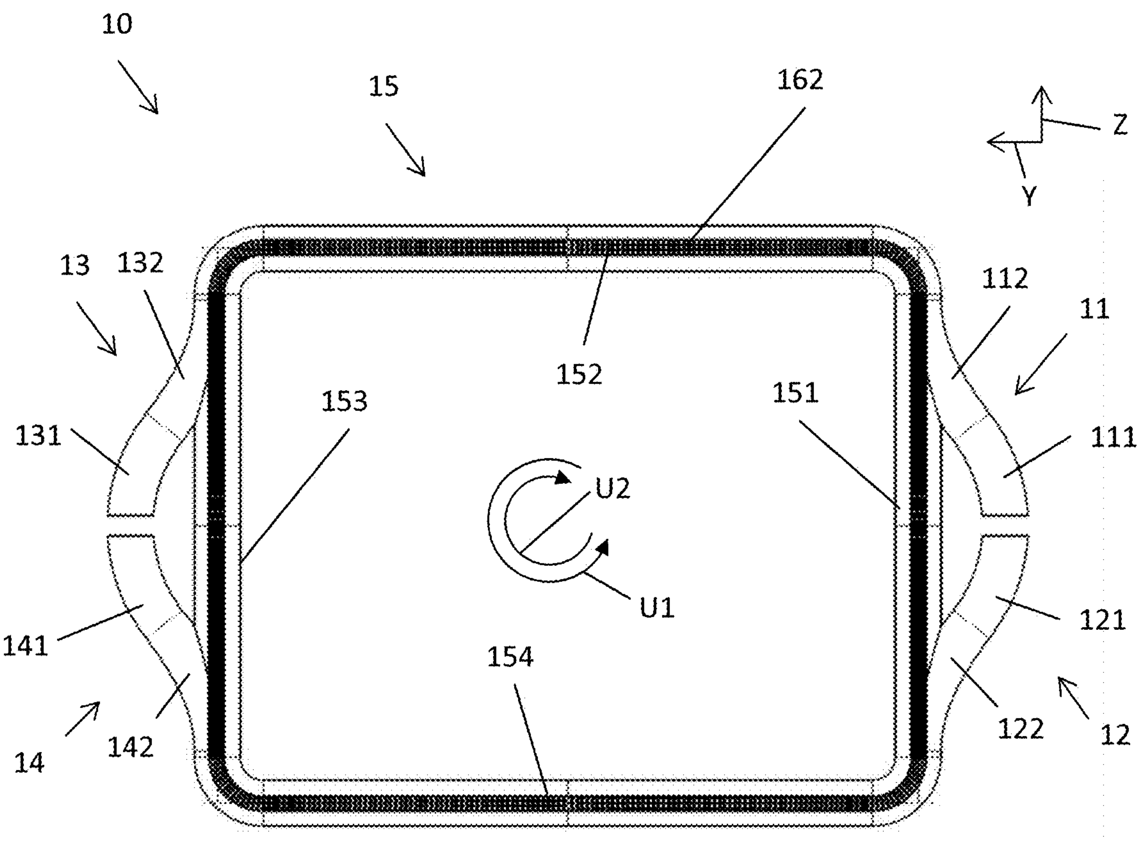
FIG. 4 shows an optical waveguide for the lighting device in FIG. 2, from behind.
Figure 5:
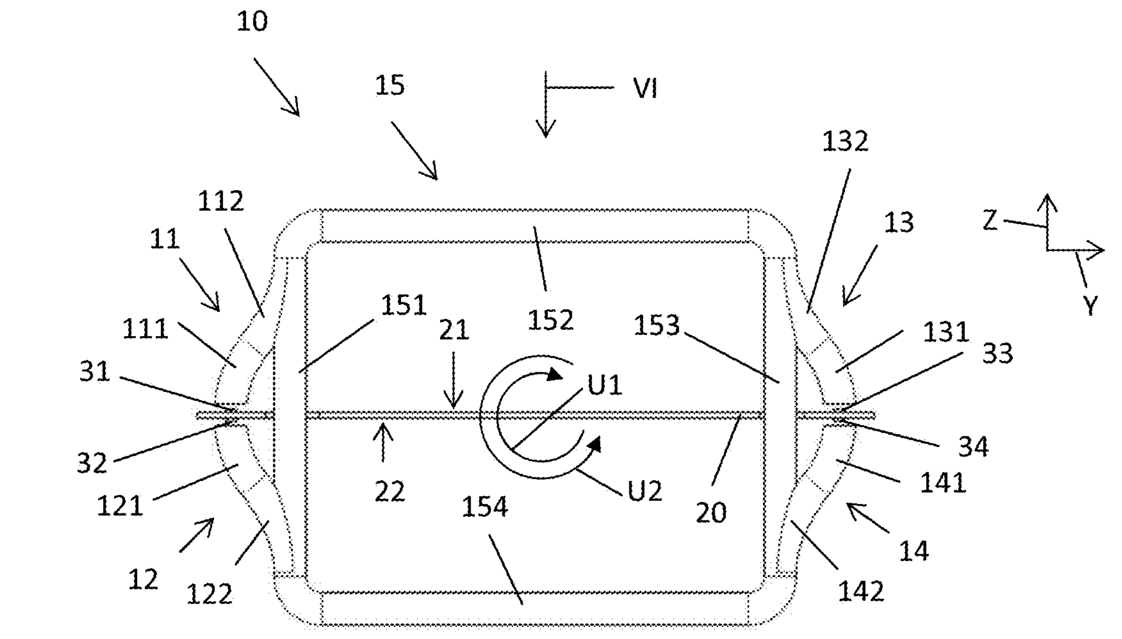
FIG. 5 shows components of a second embodiment of the lighting device looking in the direction of the arrow V in FIG. 6.

In the embodiment shown in FIGS. 3 and 4, the light-entry sections 11, 12, 13, 14 are in the same plane in relation to the light-emitting section 15, specifically the main plane HE defined by the light-emitting section 15.

The light-emitting section 15 is rectangular in this case, and has a first straight segment 151 that runs vertically Z, a second straight segment 152 at a right angle thereto, a third straight segment 153 that is parallel to the first segment 151, and a fourth straight segment 154 that is parallel to the second segment 152. The connecting segments between the straight segments 151, 152, 153, 154 are curved.

The first light-entry section 11 and second light-entry section 12 open into the first segment 151 of the light-emitting section 15. The third light-entry section 13 and fourth light-entry section open into the third segment 153 of the light-emitting section 15.

The printed circuit board 20 has a front edge with two notches 25, 26 through which the first and third segments 151, 153 of the light-emitting section 15 pass.

The printed circuit board 20 has a first section 23 and second section 24, which are laterally opposite one another with respect to the optical waveguide 10, and lie outside the area encompassed by the light-emitting section 15 when looking at the main plane HE from above, as can be seen in FIG. 3 in particular. The first and second light sources 31, 32 are on the first section 23. The third and fourth light sources 33, 34 are on the second section 24.

Figure 6:
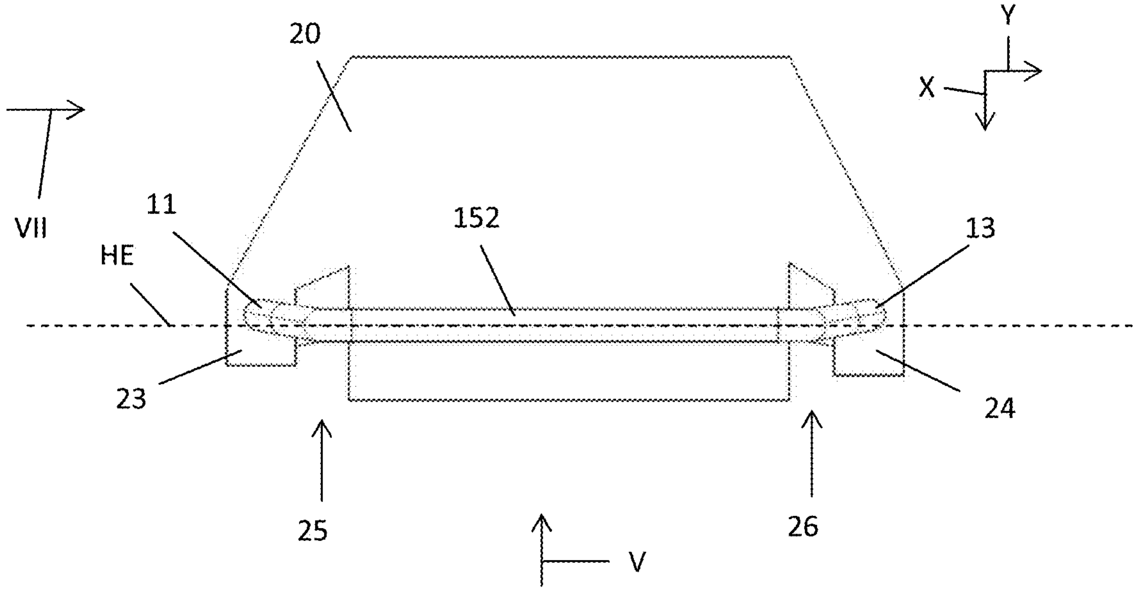
FIG. 6 shows the components looking in the direction of the arrow VI in FIG. 5.
Figure 7:
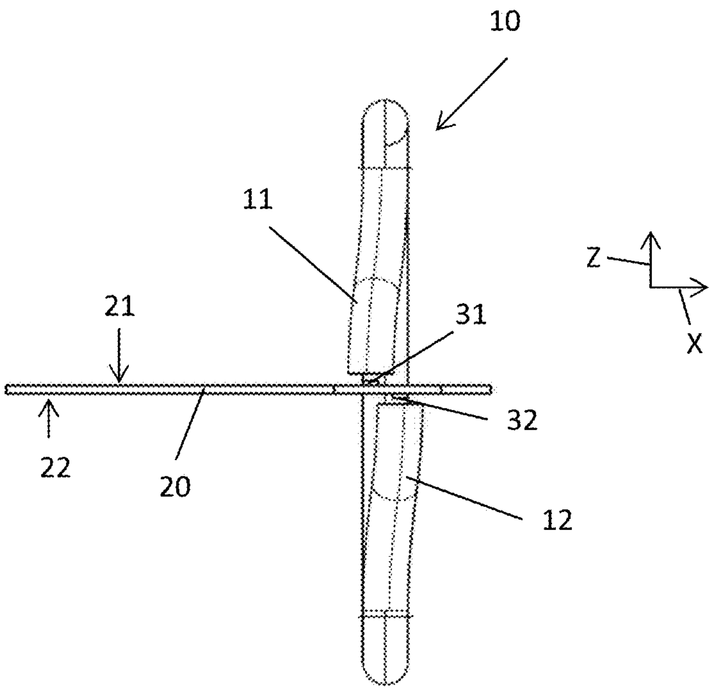
FIG. 7 shows the components looking in the direction of the arrow VII in FIG. 6.
Figure 8:
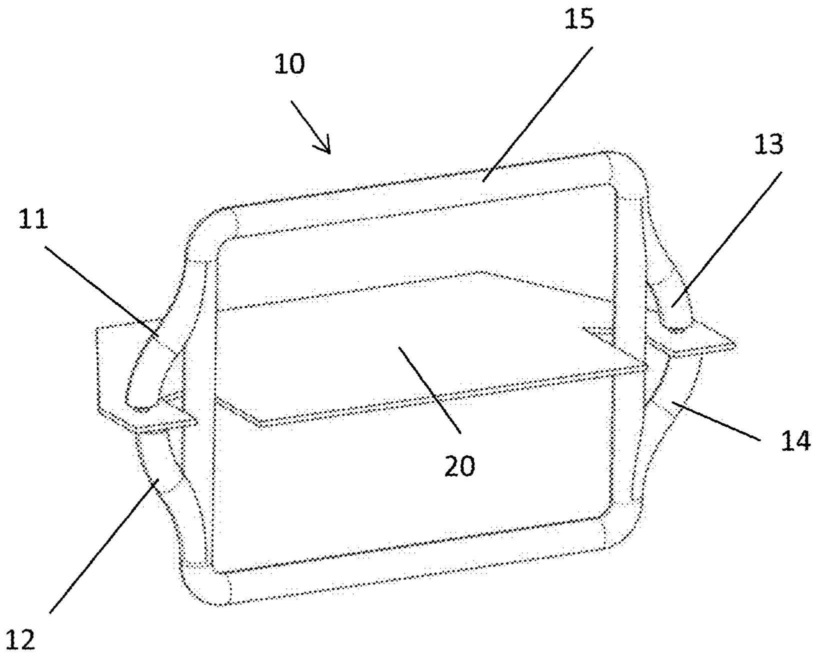
FIG. 8 shows the components in FIG. 5 from a perspective.

The main difference between the second embodiment of the lighting device 1, shown in FIGS. 5 to 8, and the first is the design of the light-entry sections 11, 12, 13, 14 and the placement of the light sources 31, 32, 33, 34. The exposed ends 111, 121, 131, 141 of the light-entry sections 11, 12, 13, 14 are offset to the main plane HE defined by the light-emitting section 15 in this case, as can be seen in FIGS. 6 and 7 in particular. The first and third light-entry sections 11, 13 are offset in the same direction, specifically toward the back in the horizontal direction X. The same applies for the second and fourth light-entry sections 12, 14, which are offset toward the front in the horizontal direction X. Accordingly, the first and third light-entry sections 11, 13 are offset in the opposite direction to the second and fourth light-entry sections 12, 14 in relation to the main plane HE. The light sources 31, 32, 33, 34 are also offset in the same manner as the light-entry sections 11, 12, 13, 14. The first and second light sources 31, 32 are therefore offset to one another in the horizontal direction X. The same is the case with the third and fourth light sources 33, 34.

LIST OF REFERENCE SYMBOLS

1 lighting device
2 housing
3 cover
4 light-emitting window
10 optical waveguide
11 first light-entry section
12 second light-entry section
13 third light-entry section
14 fourth light-entry section
15 light-emitting section
20 printed circuit board
21 upper surface
22 lower surface
23 first section
24 second section
25 notch
26 notch
31 first light source
32 second light source
33 third light source
34 fourth light source
100 motor vehicle
111 exposed end
112 end section
121 exposed end
122 end section
131 exposed end
132 end section
141 exposed end
142 end section
151 first segment
152 second segment
153 third segment
154 fourth segment
161 light-emitting surface
162 functional surface
HE main plane
U1 first circumferential direction
U2 second circumferential direction
X horizontal direction
Y lateral direction
Z vertical direction

The invention claimed is:

1. A lighting device (1) for a motor vehicle, the lighting device comprising:
an optical waveguide;
a printed circuit board having an upper surface and an opposite, lower surface in the vertical direction (Z), wherein the printed circuit board is populated with a first light source and second light source;
wherein the optical waveguide includes:
a light-emitting section that forms a closed loop, wherein the light-emitting section propagates light along the light-emitting section based on total internal reflection, wherein the light-emitting section has light-emitting optics along the light-emitting section for emitting a portion of the light propagated along the light-emitting section;
a first light-entry section;
a second light-entry section;
a third light source on the upper surface of the printed circuit board; and
a fourth light source on the lower surface of the printed circuit board;
wherein the first light-entry section and second light-entry section each have exposed ends with light-entry surfaces through which light enters the respective light-entry sections,
wherein the light-entry surfaces open into the light-emitting section,
wherein the exposed end of the first light-entry section is placed such that the light emitted by the first light source enters the first light-entry section through the entry surface,
wherein the exposed end of the second light-entry section is placed such that the light emitted by the second light source enters the second light-entry section through the entry surface;
wherein the first light source is on the upper surface of the printed circuit board, and the second light source is on the lower surface of the printed circuit board;
wherein the optical waveguide has a third light-entry section and a fourth light-entry section,
wherein the third light-entry section and fourth light-entry section each have an exposed end with an entry surface through which light enters the respective light-entry sections,
wherein the exposed end on the third light-entry section is placed such that light emitted by the third light source enters the third light-entry section through the entry surface,
wherein the exposed end of the fourth light-entry section is placed such that light emitted by the fourth light source enters the fourth light-entry section through the entry surface; and
wherein the printed circuit board has a first section, wherein the first light source and second light source are on the first section, and wherein the printed circuit board has a second section, wherein the third light source and fourth light source are on the second section.

2. The lighting device according to claim 1, wherein the light-emitting section is in a main plane (HE), wherein the printed circuit board is perpendicular to the main plane (HE).

3. The lighting device according to claim 1, wherein light conducted into the light-emitting section through the first light-entry section is propagated in the light-emitting section in a first circumferential direction (U1), wherein light conducted into the light-emitting section through the second light-entry section is propagated in the light-emitting section in a second circumferential direction (U2), wherein the second circumferential direction (U2) is opposite the first circumferential direction (U1), and/or wherein light conducted into the light-emitting section through the third light-entry section is propagated in the light-emitting section in the second circumferential direction (U2), wherein light conducted into the light-emitting section through the fourth light-entry section is propagated in the light-emitting section in the first circumferential direction (U1).

4. The lighting device according to claim 1, wherein the lighting device is a tail lamp.

5. The lighting device according to claim 1, wherein the optical waveguide is monolithic.

6. The lighting device according to claim 1, wherein the light-entry sections are formed in a main plane (HE) defined by the light-emitting section.

7. The lighting device according to claim 1, wherein the exposed end on at least one of the light-entry sections is offset in relation to a main plane (HE) defined by the light-emitting section.

8. The lighting device according to claim 1, wherein at least one of the light-entry sections has a curved end section which opens into the light-emitting section, wherein the curved end section is concave in relation to a segment of the light-emitting section into which the curved end section opens.

9. The lighting device according to claim 1, wherein the light-emitting section is rectangular and includes: a straight first segment; a straight second segment that is perpendicular to the first segment; a straight third segment that is parallel to the first segment; and a straight fourth segment that is parallel to the second segment, wherein the first light-entry section and second light entry section open into the light-emitting section at the first segment, and/or wherein the third light-entry section and fourth light-entry section open into the light-emitting section at the third segment.

10. The lighting device according to claim 1, wherein the first light source and second light source are offset to one another in a horizontal direction (X which is perpendicular to a vertical direction (Z), and/or wherein the third light source and fourth light source are offset to one another in the horizontal direction (X), which is perpendicular to the vertical direction (Z).

11. The lighting device according to claim 1, wherein the light-emitting optics have a light-emitting surface and an opposite functional surface.

12. The lighting device according to claim 1, further including a housing and a cover that covers the housing, wherein the optical waveguide is between the housing and the cover, wherein the cover has a light-emitting window in the form of a closed loop for the light emitted by the light-emitting section.

13. The lighting device according to claim 11, wherein the functional surface is structured with a prism structure.

* * * * *